United States Patent [19]
Reese

[11] 3,768,837
[45] Oct. 30, 1973

[54] TOW BAR CONSTITUTING A PART OF A HITCH ASSEMBLY ADAPTED FOR SECUREMENT TO A VEHICLE FRAME

[75] Inventor: Robert P. Reese, Elkhart, Ind.
[73] Assignee: Reese Products, Inc., Elkhart, Ind.
[22] Filed: Mar. 1, 1971
[21] Appl. No.: 119,462

[52] U.S. Cl. .............................................. 280/495
[51] Int. Cl. ............................................... B60d 1/00
[58] Field of Search ..................................... 280/495

[56] References Cited
UNITED STATES PATENTS

| | | | |
|---|---|---|---|
| 2,639,160 | 5/1953 | Studebaker | 280/495 |
| 2,569,086 | 9/1951 | Zenk | 280/495 |
| 3,463,514 | 8/1969 | Warner | 280/495 |
| 3,463,513 | 8/1969 | Burton | 280/495 |
| 2,747,892 | 5/1956 | Jones | 280/495 |
| 2,576,461 | 11/1951 | Kammerer | 280/495 |

FOREIGN PATENTS OR APPLICATIONS

| | | | |
|---|---|---|---|
| 589,030 | 12/1959 | Canada | 280/495 |

*Primary Examiner*—Robert R. Song
*Attorney*—Oltsch & Knoblock

[57] ABSTRACT

A tow bar constituting a part of a hitch assembly and including an elongated support member which extends longitudinally and under the vehicle centered between the sides thereof. One end of the support member is located near the rear bumper of the vehicle while the opposite end of the member extends forwardly of the bumper. A pair of arm members is secured to the forward end of the support member and another pair of members is secured to the support member between the ends thereof. The arm members of each pair of arm members extend laterally outwardly in opposite directions from the support member. Both pairs of arm members extend transversely of the vehicle frame and include means at the free ends thereof to secure each pair of arms to oppositely spaced parts of the vehicle frame. The support member defines a recess for receiving a coupling part of the hitch assembly.

8 Claims, 9 Drawing Figures

Patented Oct. 30, 1973 3,768,837
5 Sheets-Sheet 1

INVENTOR
ROBERT P. REESE
BY Oltsch & Knoblock
ATTORNEYS

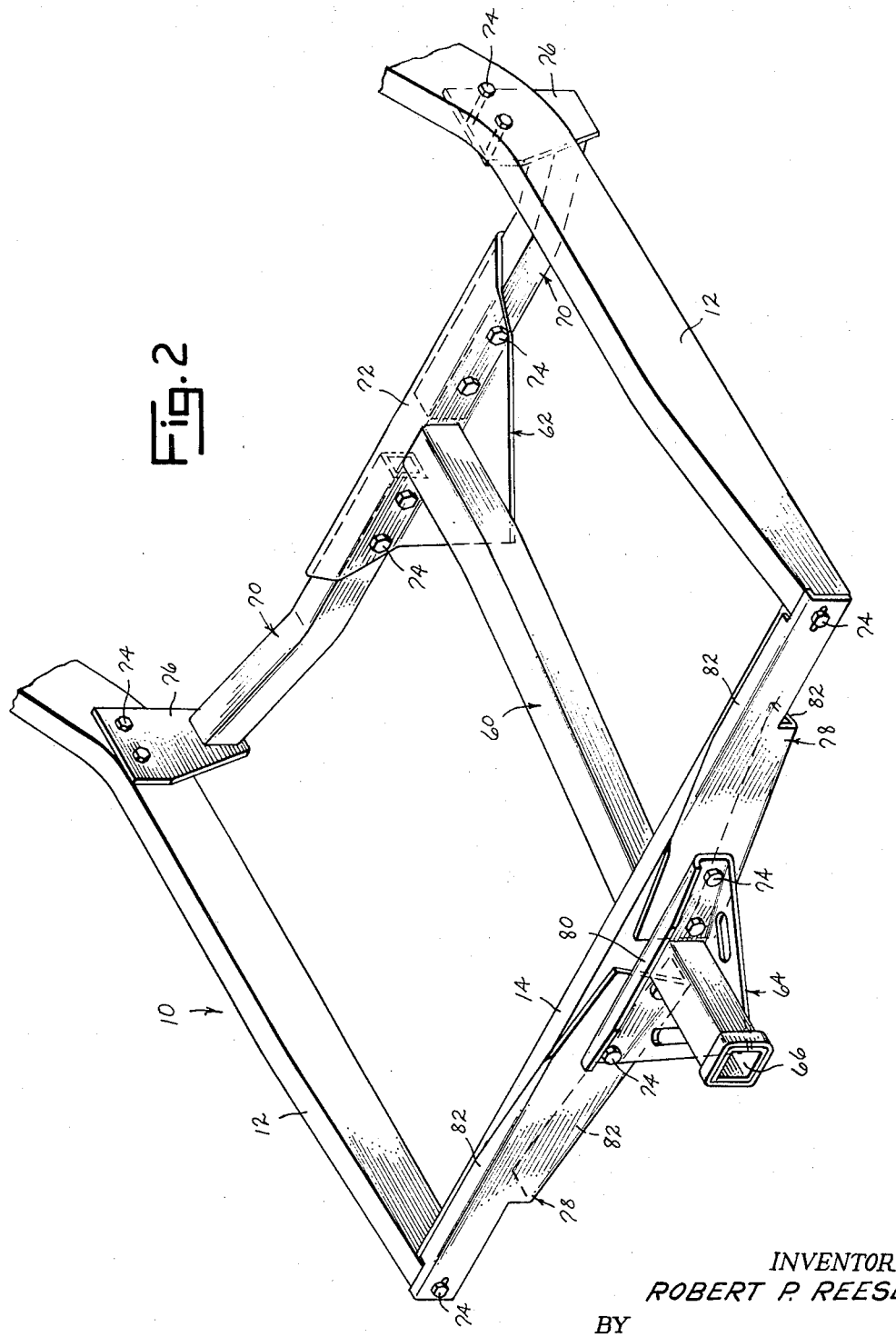

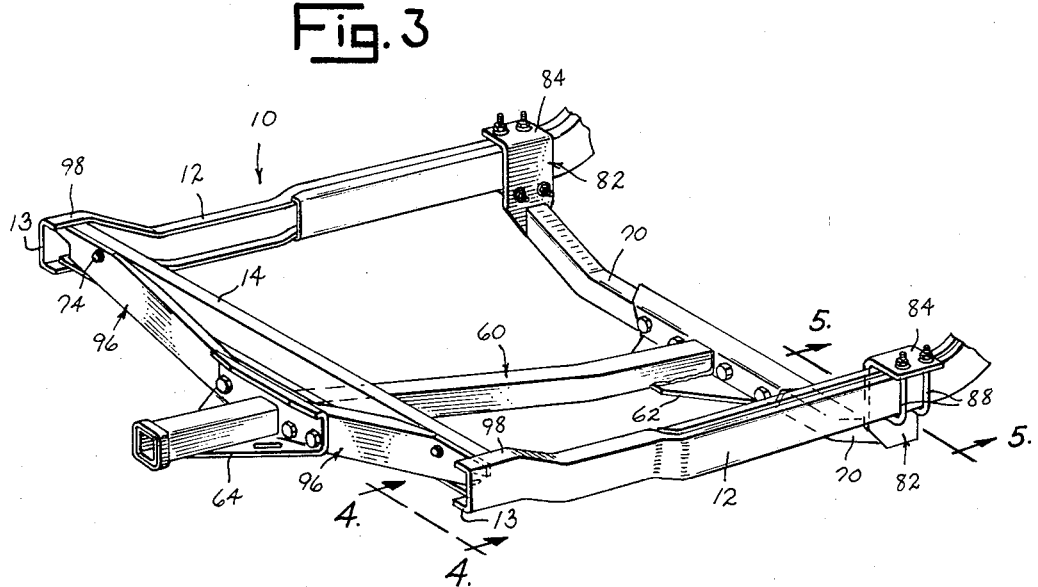
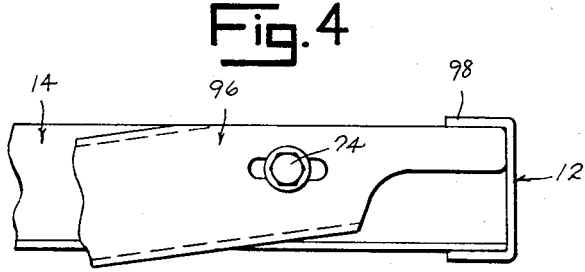
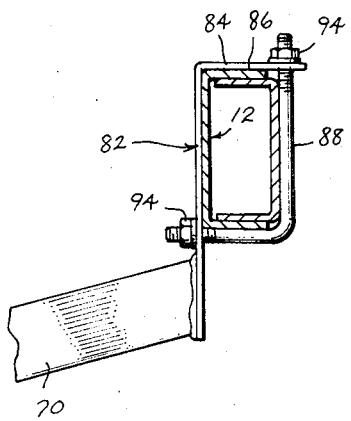

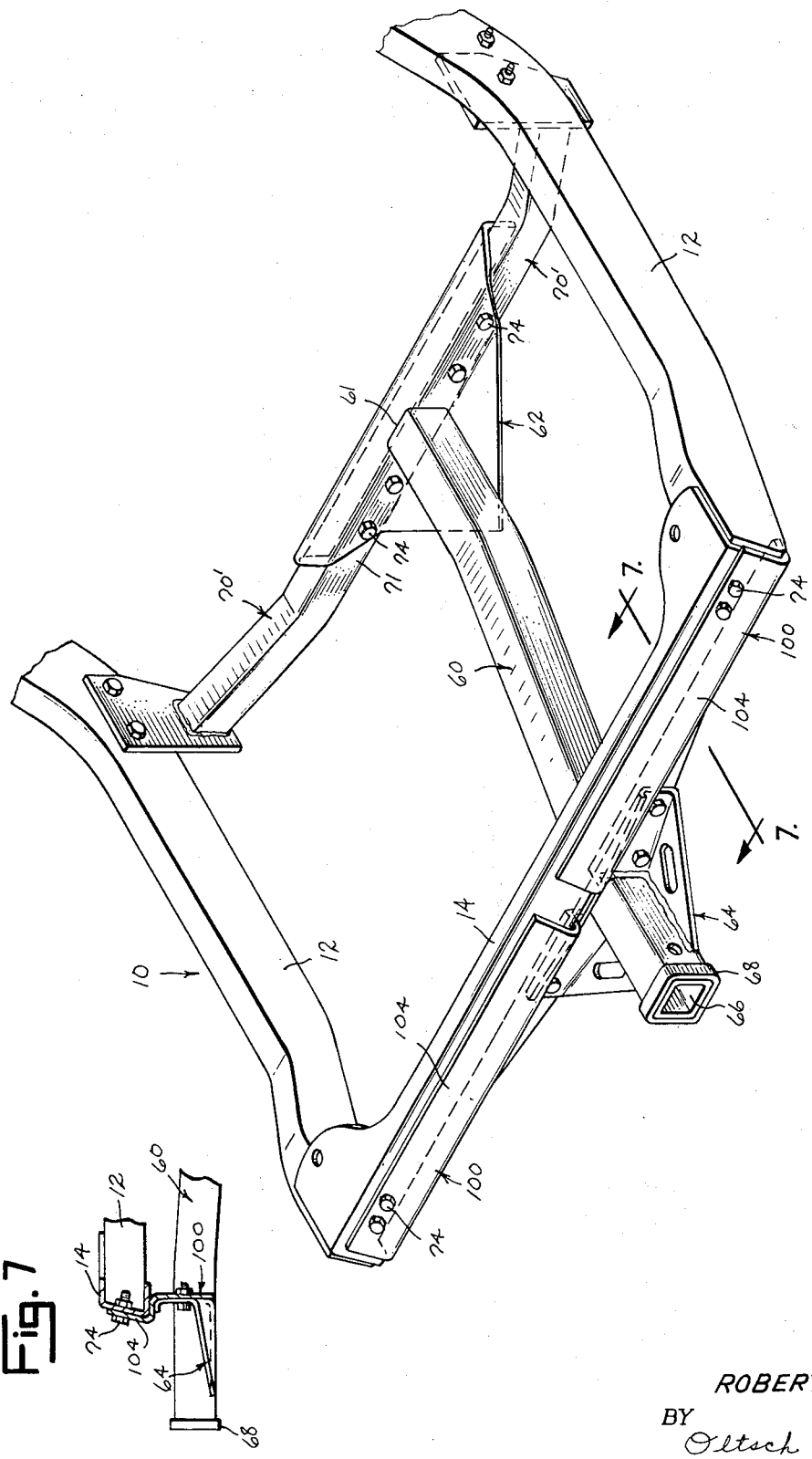

Patented Oct. 30, 1973

INVENTOR
ROBERT P. REESE
BY Oltsch & Knobeck
ATTORNEYS 3,768,837

TOW BAR CONSTITUTING A PART OF A HITCH ASSEMBLY ADAPTED FOR SECUREMENT TO A VEHICLE FRAME

BACKGROUND OF THE INVENTION

This invention relates to a tow bar which constitutes a part of a hitch assembly and which is securable to the frame of a vehicle, such as an automobile or pick-up truck.

It has been the practice to classify vehicle hitches either as a bumper hitch which bolts or is otherwise fastened to the bumper of the towing vehicle or a frame hitch which is bolted or otherwise fastened to he frame of the towing vehicle. The frame hitch is generally considered the stronger of the two hitches and has included custom-made frame parts which are bolted or welded to the undercarriage of the towing vehicle and which carry a hitch ball. Recently hitch manufacturers have provided an undercarriage hitch frame assembly, generally referred to as a tow bar, which is attachable to the frame of the vehicle and which carries the hitch ball or other coupling means. Such a tow bar includes an elongated support member to which the hitch ball can be secured and two parallel cross members secured to the support member between the ends thereof. Bolt means are provided to secure one end of the support member and the opposite ends of at least one of the cross members to the vehicle frame. To accommodate their customers, dealers of such tow bars are required to keep a large inventory of various sized parts, since the precise location and arrangement of the tow bar parts vary from vehicle to vehicle due to differences in vehicle frame construction, wheel suspension, tailpipe location, spare tire location, bumper location, and gasoline tank contour.

The tow bar of this invention is constructed of a minimum of parts and allows the dealer of hitch assemblies to fit the tow bar to various model vehicles without having to maintain a large tow bar part inventory.

SUMMARY OF THE INVENTION

This invention pertains to a tow bar which constitutes a part of a hitch assembly and which is adapted for securement to the frame of a towing vehicle. The tow bar includes an elongated support member adapted to extend longitudinally of and under the towing vehicle and between the sides thereof. The rear end of the support member is adapted to be located near the rear bumper of the vehicle. A first pair of arm members is secured to the front support member end. A second pair of arm members is provided and secured to the support member between the ends thereof. The arm members of each pair of arm members project laterally outwardly from the support member in opposite directions and are adapted to extend transversely of the vehicle frame. Securement means is provided at the free end of each arm member for connecting each pair of arm members to opposite parts of the vehicle frame. The support member includes means for carrying a coupling part, such as a hitch ball, of the hitch assembly.

In many constructions of this invention each pair of arm members will be defined by a one-piece cross member with the entire tow bar consisting of but three component parts which can be assembled in different combinations for different constructions of vehicle frames. The dealer of the hitch assembly need only maintain a minimum inventory of component parts for the tow bar in order to accommodate a variety of types of vehicle frames.

Accordingly, it is an object of this invention to provide a tow bar for a hitch assembly which is adapted to be fitted to a variety of types of vehicle frames and which consists of a minimum of component parts.

Another object of this invention is to provide a tow bar for a hitch assembly which is of economic construction and which consists of interchangeable component parts readily attachable to vehicle frames of various constructions.

Still another object of this invention is to provide a tow bar which can be easily attached to the undercarriage of a towing vehicle with the utilization of simple hand tools.

Other objects of this invention will become apparent upon a reading of the invention's description.

BRIEF DESCRIPTION OF THE DRAWINGS

FIG. 2 is a perspective view in fragmentary form of another construction of vehicle frame showing another embodiment of the tow bar of this invention affixed thereto.

FIG. 3 is a perspective view in fragmentary form of another construction of a vehicle frame showing another embodiment of the tow bar of this invention affixed thereto.

FIG. 4 is an enlarged fragmentary view as seen along line 4—4 of FIG. 3.

FIG. 5 is an enlarged fragmentary sectional view taken along line 5—5 of FIG. 3.

FIG. 6 is a perspective view in fragmentary form of another construction of a vehicle frame showing another embodiment of the tow bar of this invention affixed thereto.

FIG. 7 is a sectional view taken along line 7—7 of FIG. 6.

DESCRIPTION OF THE PREFERRED EMBODIMENTS

The preferred embodiments illustrated are not intended to be exhaustive or to limit the invention to the precise forms disclosed. They are chosen and described in order to explain the principles of the invention and its application and practical use to enable others skilled in the art to best utilize the invention.

The words "forward," "rearward" and similar directional terms used in this description and the claims are made with reference to the vehicle's orientation.

Figure 1:
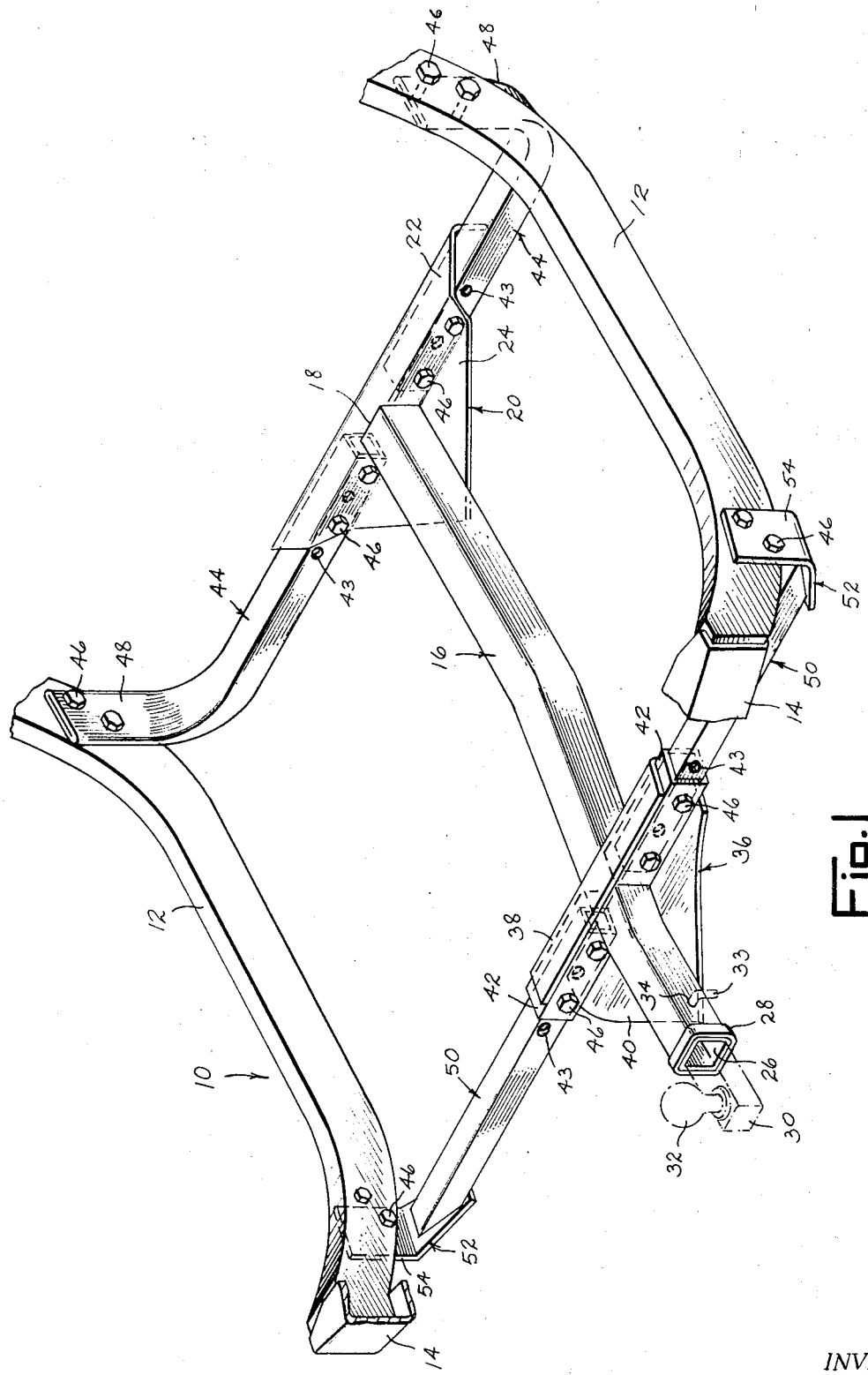
FIG. 1 is a perspective view in fragmentary form of one type of vehicle frame shown with one embodiment of the tow bar of this invention affixed thereto.

Referring to FIG. 1, vehicle frame 10 includes longitudinal frame parts 12, shown in fragmentary form, and a rear transverse frame part 14 which extends from one frame part 12 to the other frame part and which is shown in fragmentary form so as to better illustrate the subject invention. The embodiment of the tow bar illustrated in FIG. 1 includes an elongated support member 16 which extends longitudinally of the vehicle and which is usually centered between the sides thereof. Support member 16 is preferably of a tubular construction and carries at its forward end 18 a connector bracket 20. Connector bracket 20 is preferably welded or similarly bonded to support member 16 and includes an inverted U-shaped channel portion 22 and a gusset portion 24. Support member 16 defines a cavity or recess 26 at its rear end 28. Recess 26 is adapted to receive a coupling part, such as a hitch or draw bar 30 carrying a hitch ball 32, both shown in broken lines. A suitable pin 33 or anchor bolt may be inserted through registering holes 34 (only one shown) in support member 16 and correspondingly aligned holes in hitch bar 30 to secure the hitch bar to support member 16. A connector bracket 36 is carried by support member 16 between its ends 18 and 28 and is preferably located just forwardly of recess 26 thereof. Connector bracket 36 is welded or similarly bonded to support member 16 and includes a channel portion 38, gusset portion 40, which is integrally formed with channel portion 38, and two tubular parts 42 which are fitted within channel portion 38 and welded thereto. Tubular parts 42 extend laterally outwardly in opposite directions from support member 16.

A pair of arm members 44 are secured to connector bracket 20. Each arm member 44 is preferably of a tubular construction and has one end fitted snugly within chennel portion 22 of bracket 20. Bolt means 46 which includes a retainer nut extend through the sides of bracket channel portion 22 and the end of each arm member fitted therein, and thus serve to secure each arm member to bracket 20. The opposite end 48 of each arm member 44 is preferably flattened and bent upwardly so as to be positionable against either the inner or outer face of the adjacent longitudinal part 12 of vehicle frame 10. Bolt means 46 extend through registering openings in each arm member end 48 and the adjacent vehicle frame part 12 and thus serve to secure the arm member to vehicle frame 10.

A pair of arm members 50 are secured to connector bracket 36 adjacently forwardly of transverse frame part 14. Each arm member 50 is also preferably of a tubular construction, like arm members 44, and has one end fitted snugly within a tubular part 42 of bracket 36. Each arm member 50 is held within its associated tubular part 42 by bolt means 46 which extend through registering apertures in the arm member and tubular part. Each arm member 50 includes a bracket 52 which is welded or otherwise fixedly bonded to the free end of the arm. Bracket 52 includes an upwardly projecting side plate part 54 which can extend along either the inner or outer side face of the adjacent frame part 12 and which is secured thereto by bolt means 46 which extend through plate part 54 of the bracket and frame part 12. Arm members 44 and 50 serve to locate connected support member 16 below the level of frame parts 12 so as to accommodate with clearance the tail pipe, springs, gasoline tank and other components underlying the frame of the vehicle. Additionally, support member 16 is bent in a vertical plane along its longitudinal axis so as to accommodate the gasoline tank.

In FIG. 2 frame 10 represents another construction of a vehicle frame having longitudinal frame parts 12 and a rear transverse frame part 14. The tow bar adapted to fit this type of frame includes a longitudinal support member 60 having a connector bracket 62 welded or otherwise secured to its forward end and a connector bracket 64 welded or otherwise secured intermediate its ends and adjacently forwardly of hitch cavity or box 66 of the support member. A pair of tubular arm members 70 each have one end fitted snugly within channel part 72 of bracket 62 and secured thereto by bolt means 74 which includes a retainer nut. The free end portion of each arm member 70 is bent slightly upwardly and has an end plate 76 welded thereto. Each end plate 76 is adapted to abut eithe the inner or outer face of longitudinal frame part 12 and be secured thereto by bolt means 74 as shown. A pair of arm members 78 are positioned adjacently rearwardly of transverse frame part 14 and each has one end secured by bolt means 74 to channel part 80 of bracket 64. The free end of each arm member 78 is secured by bolt means 74 to transverse frame part 14 at the end of longitudinal frame part 12. Each arm member 78 preferably includes upper and lower flanges 82 which fit around transverse frame part 14. As similarly described for the tow bar shown and illustrated in FIG. 1, arm members 70 and 78 serve to position support member 60 adjacently below the gasoline tank of the vehicle and to accommodate the suspension system and tailpipe of the vehicle. Support member 60 is preferably also bent as support member 16 of FIG. 1 to accommodate the contour of the gasoline tank.

In FIG. 3, vehicle frame 10 is another type construction consisting of longitudinal frame parts 12 and a rear transverse frame part 14 which is in-set from ends 13 of frame part 12. The tow bar shown in FIG. 3 is of a similar construction to the bar illustrated and described in FIG. 2 except that the free end of each arm member 70 carries an end plate 82 which includes an out-turned flange 84. As best shown in FIG. 5, each mounting plate 82 abuts the inner face of the adjacent longitudinal frame part 12 with flange 84 extending over and resting upon the upper surface 86 of the frame part. L-shaped bolts 88 extend around the outside face 90 and lower face 92 of the frame part 12 and are secured to mounting plate 82 by nuts 94. Fixed arm members 96 which extend laterally outwardly and upwardly from support member 60 at bracket 64 are constructed so that their free ends are positionable under the upper flanges 98 of frame parts 12 and adjacently forwardly of transverse frame part 14 as best shown in FIG. 4. Bolt means 74 secure the free end of each arm member 96 to transverse frame part 14.

In FIG. 6, frame 10 is representative of another type of construction of a vehicle frame having longitudinal frame parts 12 and a rear transverse frame part 14 secured to ends of frame part 12. The tow bar adapted to fit this type of frame is similar in construction to the tow bar shown in FIG. 2 in that it includes a longitudinal support member 60, a connector bracket 62 secured to forward end 61 of the support member and a connector bracket 64 secured adjacently forwardly of support member end 68 at hitch recess 66. Arm members 70' constitute portions of a one-piece cross member 71 which is secured to bracket 62 by bolt means 74. Bracket 64 is adapted to be positioned just rearwardly of and below transverse frame part 14 and carries a pair of arm members 100. Each arm member 100 includes an elongated angle part 104 which extends extensively along transverse frame part 14 and which engages the outer and lower faces of the frame part, as best shown in FIG. 7. Angle part 104 is connected as its free end by suitable bolt means 74 to transverse frame part 14.

Figure 8:
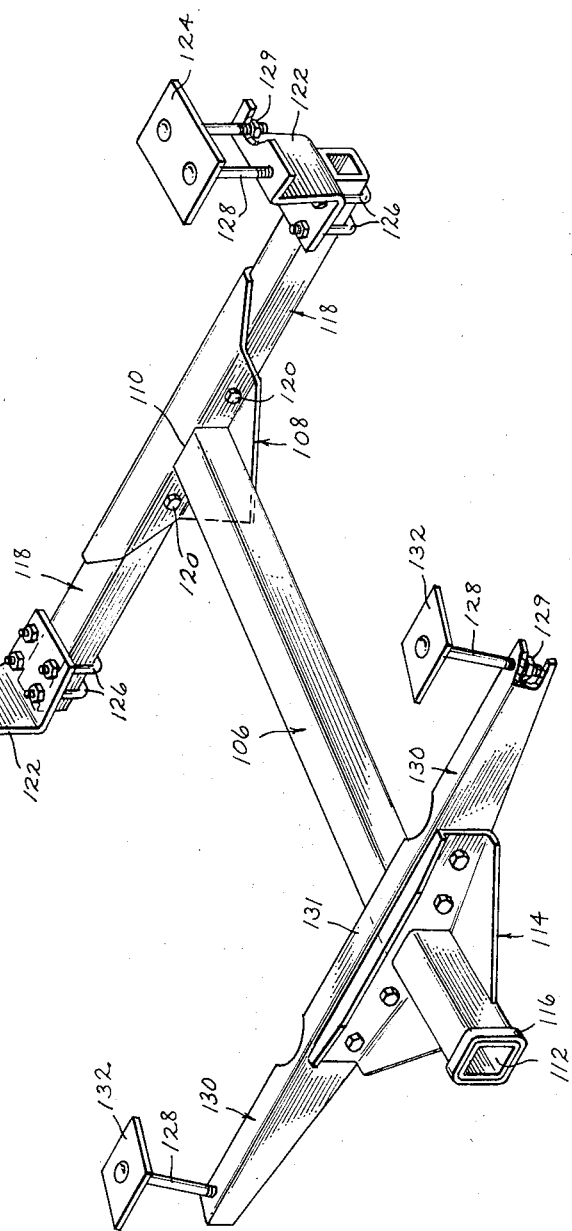
FIG. 8 is a perspective view of still another embodiment of the tow bar of this invention.
Figure 9:
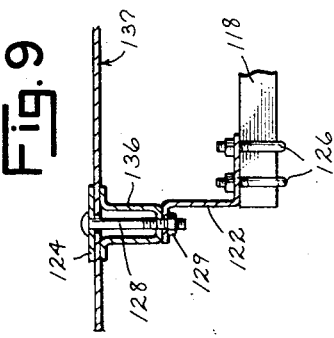
FIG. 9 is a sectional view taken along line 9—9 of FIG. 8 showing the tow bar secured to another construction of vehicle frame.

In FIG. 8, another embodiment of the tow bar of this invention is illustrated. This embodiment of the tow bar includes an elongated support member 106 which has a connector bracket 108 welded or otherwise secured to its forward end 110. Bracket 108 is of a construction similar to brackets 20 and 62 described in FIGS. 1 and 2. The rear end portion of elongated member 106 defines a hitch or draw bar recess 112 and carries a connector bracket 114 which is welded or otherwise secured to the support member between the ends thereof and preferably adjacently forwardly of end 116. Arm members 118 protrude laterally outwardly in opposite directions at end 110 of the support member. Arm members 118 constitute portions of a one-piece cross member or bar which is attached to bracket 108 by suitable bolt means 120. A connecting bracket 122 is secured by U-bolts 126 to the free end of each arm member 118. A mounting plate 124 is connected to each bracket 122 by bolts 128 and retainer nuts 129. A pair of arm members 130 extend laterally outwardly from support member 106. Arm members 130 preferably constitute portions of a one-piece cross member 131 which has a centrally located notch portion at its lower edge fitted around support member 106 and which is secured to bracket 114. A mounting plate 132 is anchored to the free end of each arm member 130 by means of a connecting bolt and nut 128. The tow bar illustrated in FIG. 9 is adapted to be utilized for those vehicles having its car body integrally formed with and constituting a part of the frame. A means of securing the tow bar illustrated in FIG. 8 to such a vehicle frame is shown in FIG. 9. The support member 106 is positioned under and extends longitudinally of the vehicle. Bolts 128 extend through tubular reinforced parts 136 of vehicle body 137 and are secured to mounting plates 124 and 132.

In assembling the tow bar of each of the above described embodiments shown in FIGS. 1–9, the hitch bar recess thereof is positioned adjacently below the bumper of the towing vehicle with the support member extending under the rear transverse frame part of the vehicle frame. Each tow bar is preferably mountable to the vehicle frame by utilizing existing holes in the frame parts. If additional holes must be drilled in the frame to accommodate a particular tow bar, the installer thereof need only utilize simple hand tools to accomplish the task. When utilizing arm members of a two-piece construction, such as the arm members in FIG. 1, additional bolt-receiving holes 43 are preferably provided in the arm members so as to permit their lateral movement relative to the support member for the purpose of accommodating vehicle frames of different size. It is to be noted that the support member and integral brackets of the tow bars illustrated in FIGS. 2, 3, 6 and 9 are of similar construction so as to allow the dealer to utilize various types of arm members to connect a tow bar to a particular vehicle frame.

It is to be understood that this invention is not to be limited to the details above given but that it may be modified within the scope of the appended claims.

What I claim is:

1. A tow bar, which constitutes a part of a hitch assembly and which is adapted for securement to the frame of a vehicle, comprising an elongated support member adapted to extend longitudinally of and under said vehicle substantially centered between the sides thereof, said support member having front and rear ends, said rear support member end adapted to be located adjacent the rear bumper of said vehicle, a connector bracket means carried at the front end of said support member, said connector bracket means including an inverted U-shaped channel portion and a gusset portion, said channel portion positioned transversely across the front end of said support member with said gusset member being secured to said support member and extending between said channel portion and support member, a first pair of arm members, said first pair of arm members fitting within said channel portion, means securing said first pair of arm members to said bracket means at said channel portion, said first pair of arm members projecting laterally outwardly in opposite directions from said support member and being adapted to extend transversely of said vehicle frame, a second pair of arm members secured to said support member between said front and rear ends thereof, said second pair of arm members projecting laterally outwardly in opposite directions from said support member and being adapted to extend transversely of said vehicle frame, means at the free ends of each arm member for securing each pair of arm members to opposite parts of said vehicle frame, and said support member defining means for carrying a coupling part of said hitch assembly.

2. The tow bar of claim 1 wherein said frame includes longitudinal frame parts, said securement means at the free end of each arm member adapted to connect each pair of arm members to oppositely located parts of said longitudinal frame parts.

3. The tow bar of claim 1 wherein said first pair of arm members constitute portions of a one-piece cross member.

4. The tow bar of claim 1 wherein said second pair of arm members constitute portions of a one-piece cross member, said support member carrying connector bracket means spaced from said rear end thereof, said cross member removably secured to said bracket means.

5. The tow bar of claim 1 wherein each arm member of said first pair of arm members has one end portion removably secured to said bracket means channel portion.

6. The tow bar of claim 5 wherein said securement means permits lateral adjustment of said first pair of arm members to accommodate vehicle frames of various widths.

7. The tow bar of claim 1 wherein said support member carries a connector bracket means between its front and rear ends, each arm member of said second pair of arm members having one end portion removably secured to said last mentioned bracket means.

8. The tow bar of claim 7 wherein said last mentioned bracket means and each arm member of said second pair of arm members includes cooperating securement means permitting lateral adjustment of said second pair of arm members to accommodate vehicle frames of various widths.

* * * * *

UNITED STATES PATENT OFFICE
CERTIFICATE OF CORRECTION

PATENT NO. : 3,768,837
DATED : October 30, 1973
INVENTOR(S) : Robert P. Reese

It is certified that error appears in the above-identified patent and that said Letters Patent are hereby corrected as shown below:

In column 6, line 10, cancel "gusset member" and insert --gusset portion--.

Signed and sealed this 1st day of July 1975.

(SEAL)
Attest:

RUTH C. MASON
Attesting Officer

C. MARSHALL DANN
Commissioner of Patents
and Trademarks